3,660,287
AQUEOUS REACTIVE SCALE SOLVENT
Frank J. Quattrini, P.O. Box 1414,
Midland, Tex. 79701
No Drawing. Filed Oct. 12, 1967, Ser. No. 674,730
Int. Cl. C02b 5/00
U.S. Cl. 252—8.55 B       13 Claims

ABSTRACT OF THE DISCLOSURE

An aqueous reactive scale solvent composition comprising basically a partially neutralized aminopolyacetic acid and a carbonate, such as, ammonium bicarbonate, has been found useful for the removal of scale by dissolving such deposits as calcium sulfate from oil well equipment, the porous and permeable zones of the reservoir rock, and from industrial equipment. The pH of the aqueous composition should be between 6.5 and 9.5 and preferably between a narrow range of 7.5 to 7.8, depending upon the temperature of the scale environment, e.g. the higher the temperature, the higher should be the pH of the solution.

---

This invention is concerned with a novel composition for dissolving calcium sulfate "gyp" scale and/or mixed scale deposits containing varying amounts of calcium, magnesium, barium sulfates and/or carbonates.

The accumulations of such scale deposits in producing oil wells, water injection wells, and in industrial equipment, such as, heat exchangers, steam and hot water boilers, condensers, flow lines, treaters, cooling towers, internal combustion engines and other water handling and associated equipment, has been met with various compositions and methods for their removal. Such deposits, for all practical purposes, can be considered as insoluble in water, and although they are considered soluble in strong acids, such as, concentrated sulfuric acid, the use of these acids in oil well and industrial equipment is generally considered impractical.

A common method for removing calcium sulphate scale encrustations or deposits has been to contact such scale deposits with strong concentrations of caustic solutions such as sodium hydroxide or potassium hydroxide through prolonged contact for periods of 48 to 72 hours or even longer. Calcium sulfate scale is converted to another water insoluble material such as calcium hydroxide. The caustic solution must be continuously recirculated over the scale encrusted surface and frequently the reaction is not complete due to the occluding nature of the hydroxide conversion product. The secondary insoluble calcium hydroxide product must then be contacted with hydrochloric acid to produce the water soluble calcium chloride which dissolves in the aqueous solution removing it from the surface.

Strong solutions of ammonium bicarbonate have also been used in the removal of calcium sulfate scale from encrusted metal surfaces of industrial water handling equipment as well as the surfaces of pipe and perforations "down hole" in oil wells. As in the case of strong caustic solutions, however, the ammonium bicarbonate converts the "gyp" scale into another insoluble product, namely, in this instance, calcium carbonate. This product of conversion must then be contacted with an acid such as hydrochloric acid before it can be dissolved in water and removed from the system. The rate at which the ammonium bicarbonate conversion of the "gyp" scale takes place decreases in ratio to the amount of conversion product, due, as in the case of strong caustic solutions, to occlusion on the scale surface. Frequently, therefore, the treatment is incomplete. Efficiency is not appreciably increased even when the ammonium bicarbonate solution is continually recirculated over the scale encrusted area.

A still further method presently used for removing calcium sulfate scale involves the use of solutions of alkaline sequestering or chelating agents such as ethylene diamine tetracetic acid, its tetrasodium salt, and nitrilo triacetic acid trisodium salt. Such solutions are maintained at substantially higher than ambient temperature and must remain in contact with the scale for extended periods of time. The chelation or dissolution of the scale is generally slow and although it has been used industrially, as well as in producing oil wells, its slow and inefficient performance leaves much to be desired.

The composition of this invention comprises basically a partially neutralized aqueous solution of an amino polyacetic acid and a carbonate. The carbonate reacts with the "gyp" scale surface resulting in a lowering of the pH at the point of reaction. The calcium ion is released during the reaction and is immediately taken up by the amino polyacetic acid which serves as a sequestering or chelating agent. Simultaneously with the release of the calcium ion during reaction of the carbonate with the scale, carbon dioxide is also released. The rapid and progressive reaction caused by the carbonate activity removes the "gyp" scale by forming two soluble products of reaction. In the case of calcium sulfate scale, the products are a soluble calcium chelate and a soluble sulfate salt.

The amino polyacetic acid chelating agents may be of the mono- or poly-amino type. Preferred are alkylene polyamino polyacetic acids including ethylene diamine tetracetic acid, diethylene triamine penta-acetic acid and N-hydroxyethyl imino diacetic acid. Mono-amino triacetic acids such as nitrilo triacetic acid may also be used.

The concentration of amino polyacetic acid chelating agent in the aqueous solution preferably ranges between 10 and 18 percent by weight, although a greater or lesser concentration may be used.

The sequestering or chelating agent is partially neutralized with either an inorganic alkali such as ammonium hydroxide, sodium hydroxide and potassium hydroxide and/or a low molecular weight hydroxy amine or morpholine, either alone or in combination with an inorganic alkali. Specific examples of low molecular weight hydroxy amines and morpholines include mono-ethanol amine, diethanol amine, triethanol amine, mono-isopropanol amine, mixed isomers of isopropanol amines, morpholine, N-amino ethyl morpholine, and other short chain isomers and derivatives of ethanol and propanol amines and morpholines.

Partial neutralization of the chelating agent is accomplished by adding the inorganic alkali and/or low molecular weight hydroxy amine to an aqueous solution of the chelating agent in sufficient amount to maintain the pH range of the solution between 6.5 and 9.5. Preferably, the pH of the solution is maintained in the narrow range of 7.5 to 7.8. The extent of partial neutralization of the mono-amino or polyamino polyacetic acid depends to a great extent on the particular compound. In the case of the ethylene diamine tetracetic acid, 3.0 to 3.8 of the acid groups should be neutralized. In the case of nitrilo triacetic acid, only 2 to 2.8 acid groups need be neutralized. The inorganic alkali concentration in the aqueous solution generally ranges between 3 and 10 percent by weight, while the hydroxy amine will range generally between 2 and 11 percent by weight, though greater or lesser amounts may be used.

Examples of suitable carbonates include ammonium carbonate, ammonium bicarbonate, sodium carbonate, sodium bicarbonate, potassium carbonate, and potassium bicarbonate. The carbonate or bicarbonate compounds should be present in the aqueous composition to the extent of between 5 and 15 percent by weight, although greater or lesser percentages may be used where required.

Though as previously stated, the chelating agent may be partially neutralized with either an inorganic alkali or a low molecular weight hydroxy amine, the amine is preferred, since it offers the advantage in that it stabilizes the dissolved carbonate or bicarbonate compounds preventing the premature breakdown of the compound and the release of carbon dioxide. The stability of the dissolved carbonate or bicarbonate is considerably less when alkali metal hydroxides only are used to partially neutralize the chelating agent.

Additional compounds may be included in the scale removing composition. These include an acidulating agent such as formaldehyde, glyoxaldehyde, pyruvic aldehyde, acetaldehyde, propionaldehyde, ammonium hydroxy acetic acid, and/or ammonium sulfamate. These compounds help to sustain the contact reaction between the composition and the scale and are present in the solution to the extent of 1 to 5 percent by weight of the solution.

Solubilizing agents such as urea in concentrations of 5 to 10 percent by weight in the solution are helpful.

Surface active materials such as polyethylene glycol or an anionic surfactant such as sodium aryl or alkyl sulfonate chosen for its wetting and penetrating characteristics are helpful when present in the solution in concentrations ranging from 1 to 3 percent by weight.

When using the composition of the present invention for dissolving calcium sulfate, temperatures substantially above ambient temperature are not required for purposes of efficiency. Temperatures as low as 50 to 60° F. have been found satisfactory. However, an increase in temperature to a range such as normally is found under bottom hole conditions of producing oil wells which may range from about 90 to 160° F. will cause a rapid increase in the reaction and in turn increase the rate of dissolving the calcium sulfate scale.

The composition of the present invention is useful for dissolving calcium sulfate "gyp" scale or other scale encrustations, such as, sulfates or carbonates of calcium, barium, magnesium, which may be mixed with the "gyp" scale as accumulated deposits on oil, gas, or water well equipment, as well as, industrial equipment. The composition will remove the "gyp" scale from the casing surface and casing perforations, tubing, suckerrod and pump surfaces, as well as, the "gyp" deposits from the rock formation face in "open-hole" type well completions. When pumped into the well, the composition by means of sufficient hydrostatic head pressure, or by applying additional positive pressure to overcome the existing reservoir pressure, will dissolve the deposited "gyp" scale in the producing channels of the reservoir rock, thus restoring permeability to the flow of oil and/or gas. The composition will also dissolve "gyp" or anhydrite, which may be naturally present as part of the rock matrix, thus establishing new porosity and flow channels for increasing fluid flow into the well.

It will be appreciated that this scale dissolving composition offers distinct advantages over previously known methods. Whereas when certain chelating agents alone have been used they have been slow and inefficient as previously pointed out. Also, ammonium bicarbonate has been used but offered the disadvantage that an intermediate insoluble product is formed which must then be treated further with acid to remove it. A composition containing a partially neutralized chelating agent and bicarbonate or carbonate avoids these and other disadvantages.

The following are specific examples describing various types of compositions within the contemplation of the present invention. All percentages shown are by weight.

EXAMPLE 1

| | Percent |
|---|---|
| Water | 60.0 |
| Mono-ethanol amine | 12.0 |
| Nitrilo triacetic acid | 16.0 |
| Ammonium bicarbonate | 10.0 |
| Polyethylene glycol | 2.0 |

EXAMPLE 2

| | Percent |
|---|---|
| Water | 67.0 |
| Mono-ethanol amine | 11.0 |
| Nitrilo triacetic acid | 12.0 |
| Ammonium bicarbonate | 10.0 |

EXAMPLE 3

| | Percent |
|---|---|
| Water | 60.0 |
| Mono-ethanol amine | 12.0 |
| Ethylene diamine tetracetic acid | 16.0 |
| Ammonium bicarbonate | 10.0 |
| Polyethylene glycol | 2.0 |

EXAMPLE 4

| | Percent |
|---|---|
| Water | 60.0 |
| Mono-ethanol amine | 11.0 |
| Nitrilo triacetic acid | 14.0 |
| Urea | 5.0 |
| Ammonium bicarbonate | 8.0 |
| Formaldehyde | 1.0 |
| Sodium alkyl sulfonate | 1.0 |

In summary, the combination of a partially neutralized alkylene diamine polyacetic acid or monoamine polyacetic acid and ammonium bicarbonate when reacted with calcium sulfate scale causes true solution of the scale in a single step operation. This is accomplished at lower reaction temperatures and in a considerably shorter time than has been possible with previously known compositions. In addition, it is possible to control the pH range of the reaction within very close limits. Furthermore, only static contact between the scale encrusted surface and the novel composition is required whereas formerly a recirculation type of treatment of scale was required.

What is claimed is:

1. An aqueous gyp or anhydrite scale solvent, consisting essentially of an aqueous solution of a partially neutralized amino polyacetic acid selected from the group consisting of ethylene diamine tetraacetic acid, diethylene triamine pentaacetic acid, N-hydroxyethyl imino diacetic acid and nitrilo triacetic acid, said partially neutralized amino polyacetic acid being present in an amount capable of chelating at least part of the calcium ions released during the reaction of an inorganic carbonate and said scale, and an inorganic carbonate selected from the group consisting of ammonium and alkali metal carbonates and acid carbonates in an amount capable of reacting with said scale and releasing calcium ions, the pH of said scale solvent being in a range of from about 6.5 to about 9.5.

2. An aqueous composition as claimed in claim 1 wherein said pH is between 7.5 and 7.8.

3. An aqueous composition as claimed in claim 1 wherein the concentration of said amino polyacetic acid in said aqueous composition is between 10 and 18 percent by weight.

4. An aqueous composition as claimed in claim 1 wherein the concentration of said inorganic carbonate in said aqueous composition is between 5 and 15 percent by weight.

5. An aqueous composition as claimed in claim 1 wherein said organic carbonate is taken from the group consisting of ammonium carbonate, ammonium bicarbonate, sodium carbonate, sodium bicarbonate, potassium carbonate, and potassium bicarbonate.

6. An aqueous composition as claimed in claim 1 further comprising an inorganic alkali for partially neutralizing said amino polyacetic acid, said inorganic alkali being taken from the group consisting of ammonium hydroxide, sodium hydroxide and potassium hydroxide.

7. An aqueous composition as claimed in claim 6 wherein the concentration of said inorganic alkali in said aqueous composition is between 3 and 10 percent by weight.

8. An aqueous composition as claimed in claim 1 further comprising a low molecular weight amine for partially neutralizing said amino polyacetic acid, said amine being taken from the group consisting of mono-ethanol amine, diethanol amine, triethanol amine, mono-isopropanol amine, morpholine and N-amino-ethyl morpholine.

9. An aqueous composition as claimed in claim 8 wherein the concentration of said amine in said composition is between 2 and 11 percent by weight.

10. An aqueous composition as claimed in claim 1 further comprising 5 to 10 percent by weight of urea.

11. A process for removing gyp or anhydrite scale from well and industrial equipment, comprising contacting said scale with an aqueous composition consisting essentially of a partially neutralized amino polyacetic acid in an amount capable of chelating at least part of calcium ions released during the reaction of an inorganic carbonate and said scale, and an inorganic carbonate selected from the group consisting of ammonium and alkali metal carbonates and acid carbonates in an amount capable of reacting with said scale and releasing calcium ions, the pH of said composition being in a range of from about 6.5 to about 9.5.

12. A process for restoring the fluid permeability of the gyp or anhydrite scale encrusted flow channels from oil and gas producing reservoir formations, comprising dissolving said gyp or anhydrite scale with an aqueous composition consisting essentially of a partially neutralized amino polyacetic acid in an amount capable of chelating at least part of calcium ions released during the reaction of an inorganic carbonate and said scale, and an inorganic carbonate selected from the group consisting of ammonium and alkali metal carbonates and acid carbonates in an amount capable of reacting with said scale and releasing calcium ions, the pH of said composition being in a range of from about 6.5 to about 9.5.

13. A process for dissolving gyp or anhydrite scale present naturally as part of rock matrix to establish new porosity and flow channels, comprising contacting said rock matrix with an aqueous composition consisting essentially of a partially neutralized amino polyacetic acid in an amount capable of chelating at least part of calcium ions released during the reaction of an inorganic carbonate and said scale, and an inorganic carbonate selected from the group consisting of ammonium and alkali metal carbonates and acid carbonates in an amount capable of reacting with said scale and releasing calcium ions, the pH of said composition being in a range of from about 6.5 to about 9.5.

References Cited

UNITED STATES PATENTS

| 3,481,400 | 4/1969 | Kerver et al. | 166—312 X |
| 2,396,938 | 3/1946 | Bersworth | 252—86 X |
| 2,777,818 | 1/1957 | Gambill | 252—8.55 |
| 3,053,897 | 9/1962 | Clark et al. | 252—86 X |
| 3,308,065 | 3/1967 | Lesinski | 252—82 |

FOREIGN PATENTS

| 478,209 | 1/1938 | Great Britain | 252—86 |

OTHER REFERENCES

Sequestrene, publication published by Alrose Chemical Co., Providence, R.I. 1952, pp. 1 to 5.

HERBERT B. GUYNN, Primary Examiner

U.S. Cl. X.R.

166—305, 310, 311; 252—80, 82